June 20, 1939.　　　　F. W. GAGE　　　　2,163,029

METHOD OF PROCESSING MOTION PICTURE FILM

Filed Dec. 11, 1937

INVENTOR
FRED W. GAGE
BY W. E. Beatty
ATTORNEY

Patented June 20, 1939

2,163,029

UNITED STATES PATENT OFFICE 2,163,029

METHOD OF PROCESSING MOTION PICTURE FILM

Fred W. Gage, Beverly Hills, Calif., assignor to Warner Bros. Pictures, Inc., New York, N. Y., a corporation of Delaware Application December 11, 1937, Serial No. 179,328

2 Claims. (Cl. 95—5)

This invention relates to a method of processing motion picture film and has particular reference to a method of obtaining predetermined photographic values, such as density values, on a motion picture film.

In the production of motion pictures a motion picture film conveying a completely depicted story is made up from a number of negative films photographed in different localities and under different lighting conditions.

Since it is impossible in the present state of the cinematographic art to so regulate the photographic cameras and to control the lighting conditions of the sets or scenes being photographed to obtain different films all having substantially the same density values, it is necessary to correct for these photographic values either in processing the original negative films, or in subsequent processing of the copies or prints of these films, so as to finally obtain a continuous film wherein there is no noticeable amount of change in density throughout the entire film. Conversely, it may be desirable at times to change the density values of particular parts of scenes of a motion picture in accordance with the character of such scene.

The common method of determining the amount of correction in density to be applied to various sections of a motion picture film is to print "light test strips" of typical sections of each scene, or portions of each scene wherein the lighting conditions are different. These light test strips are well known in the art and each generally comprises a series of eleven frames printed from a typical section of a scene from the negative film and sequentially varying in density from a substantially minimum to a substantially maximum amount of opacity. Indicia indicative of the density of each frame are provided along these various consecutive frames. The successive frames of each strip are then compared with a frame of a motion picture film having a proper degree of density. On comparison of the light test strip with such ideal frame, the frame of the test strip having a density most similar to that of the ideal frame is then determined and the indicia appropriate thereto is used in determining the correct processing data for subsequent treatment of either the corresponding negative film or prints thereof.

Heretofore the aforementioned light test strips were compared with a standard photograph or film frame of a motion picture film by directly viewing the same through a diffused light. The most common method of so comparing the light test strips was to place both a frame of standard density value and the light test strip to be compared on an illuminated opal or ground glass. The various film frames of the light test strip, progressively varying in density, were then compared with the standard film frame to determine the particular frame on the light test strip which compared most favorably with the standard film frame. The indicia appropriate to such determined frame on the light test strip was then employed to determine the correct processing of the film of the scene corresponding to such light test strip. This method of looking at the films themselves to determine the correct processing data is very unsatisfactory because they are tested under conditions which are radically different from the conditions under which the film is used commercially in the theater. According to the above prior practice the small film images are viewed directly by transmitted light while in the final reproduction of the motion picture film in the theater these images, greatly magnified, are viewed by light transmitted through the film and reflected from the projection screen. On projecting and viewing, as is customary in the review room, a motion picture from a positive print prepared by the prior art comparison method above described, it usually occurs that the various portions of the motion picture do not have the desired or a uniform density. This requires reprinting the faulty sections. According to the present invention this reprinting has been largely overcome with a consequent saving in production costs.

The object of the present invention is to obviate the defects and disadvantages of the above mentioned method of comparing a film or light test strip with a photograph or film of standard photographic values.

This is accomplished by projecting a sample or light test strip of a film to be processed upon a screen while simultaneously projecting the image of a photograph or film of standard photographic values upon an adjacent portion of the screen by light beams of substantially the same intensity and magnification, thereby resulting in two projected and enlarged images which permit accurate and true comparison of the various photographic values of the two images as a whole or as to any detailed parts thereof.

The manner in which the above and other objects of the invention are accomplished will be more readily understood on reference to the following specification read in conjunction with the accompanying drawing wherein.

Figure 2:
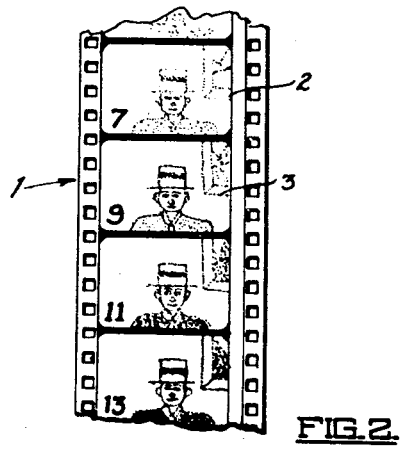
Fig. 2 is a view of a section of a light test strip.

In carrying out the invention a light test strip is made from each scene or portion of a scene of the original negative film involving different lighting conditions. Each of these strips comprises a series of picture frames, eleven in number, which is printed from one negative film by a special printing machine wherein the printer light intensity is gradually increased so as to result in a series of picture images either of a single frame of the negative or of successive frames of the negative having gradually increasing density on the successive frames thereof. As shown in Fig. 2, illustrating an exposed and developed light test strip 1, the successive film frames 2, 3, etc., have indicia (7), (9), (11), etc., thereon to indicate the changes in printer light intensity to be used when printing from the negative film onto a positive print thereof so as to ultimately obtain on the print a density comparable with the density of a particular test strip frame chosen.

Figure 1:
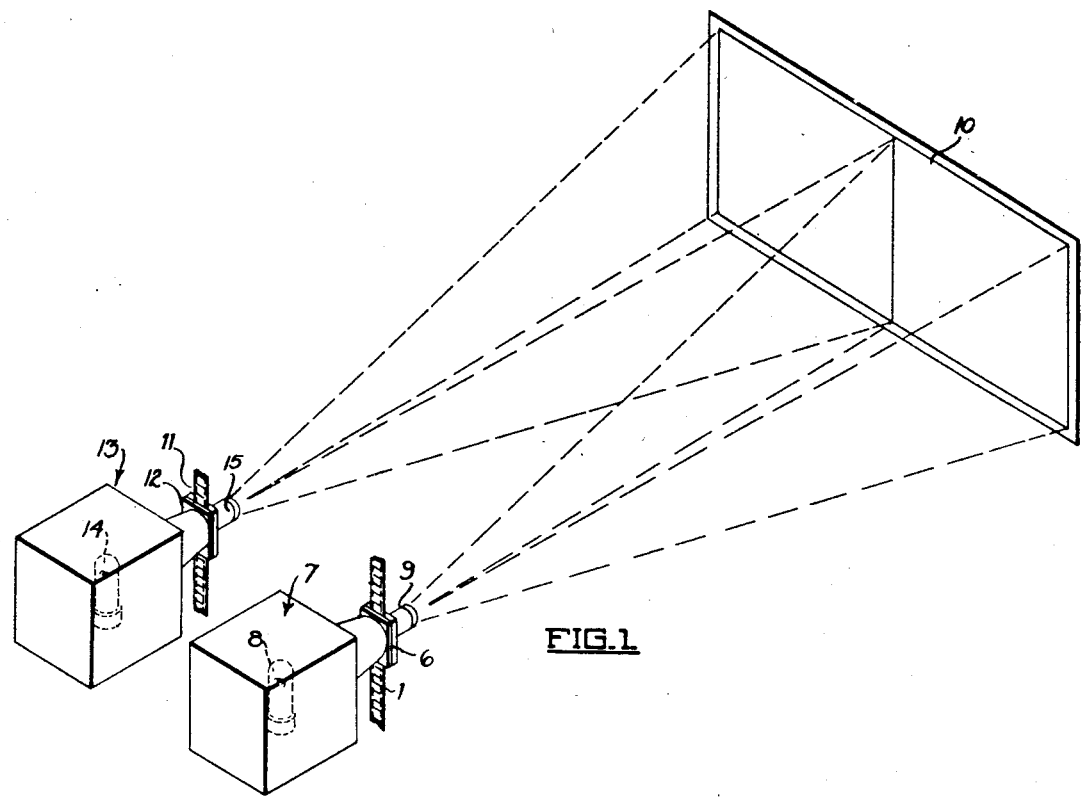
Fig. 1 is a perspective view of the picture projector arrangement for comparing the photographic values of a film with a film of proper photographic values in accordance with the present invention.

The light test strips as above obtained are placed in succession in the film gate 6 of a stereopticon 7 (Fig. 1). Stereopticon 7 may be of standard construction and therefore the details thereof have been omitted in the drawing for the purpose of clarity. Preferably, however, means (not shown) is provided for preventing undue heating of the film therein, which means is well known in the art. The image of a single frame of the light test strip 1 is projected by means of a lamp 8 and optical system generally indicated at 9 upon the right hand side of a reflecting screen 10 of the usual type. A film 11 or a single film frame having a proper density and preferable contrast value also is then provided in a film gate 12 of a stereopticon 13, similar to that of 7 and placed closely adjacent the stereopticon 7 for side by side projection of the image of the film 11 with the image of the light test strip 1. The lamp 14 and optical system 15 of the stereopticon 13 are matched with those of 8 and 9, respectively, to project a beam of light of equal intensity and magnification onto the left hand side of the screen 10 with one edge thereof adjoining the adjacent edge of the light beam projected by the stereopticon 7. The two projected pictures will be of equal magnitude since the distance between the stereopticons 7, 13 and the screen 10 is equal. The various film frames of the light test strip 1 are then projected in succession until the image of a frame thereof is found to correspond in density most favorably with the density of the image of the ideal frame of the film 11. This comparison may be made between the over-all density of the two projected film frames or between various detailed parts of those frames. For example, in cases where actors or other centers of interest in the picture are found, a comparison is made between the density of these various detailed parts instead of between the over-all density of the entire film frame image. The indicia (7), (9) or etc., found on the selected test strip frame is then marked on a suitable card and is subsequently used when preparing a print of the negative of the corresponding scene to adjust the printer light intensity.

After obtaining the various prints of the original negative films which have been printed in accordance with the light changes determined by comparison with a standard film frame, these various prints are then edited, cut and assembled to produce a single continuous print of the dramatic story. The original negative films are then cut and assembled to match this continuous print.

New light test strips are then prepared from the original negative film thus cut and assembled and these test strips are again compared with a film or frame of proper density, with the apparatus illustrated in Fig. 1. The printing data thus obtained as a result of this comparison is then employed to determine the printer light intensity to be used during the making of the final release prints for audience purposes.

Preferably the standard of comparison, namely, film 11, and the light test strips are all prepared from the negative or negatives of the same motion picture film. Also the standard of comparison may be made either by selecting a particular frame on a light test strip or by selecting a particular frame on an ordinary positive print of a portion of the motion picture negative.

It will be apparent therefore that this method makes it possible to start with a plurality of different photographed negative films having different degrees of density and to produce therefrom a positive print having uniform density values throughout. On the other hand the invention may be used to change in any desired manner the density values of different portions of the positive print. In any case, it is to be noted that the film is prepared under testing conditions substantially the same as the conditions found in a theatre before an audience.

I claim:

1. The method of processing a print of a developed motion picture film which comprises printing the film frame images of a selected portion of said film on a film strip with the successive film frames of said portion in graduated photographic values, indicating film processing data appropriate to each of said images on said film strip, simultaneously projecting onto a portion of a screen surface the image of a photograph, of a print from said developed film, of proper photographic value while sequentially projecting onto an adjacent portion of said screen surface the film frame images of graduated photographic values of said film strip by illuminating said film frames and said photograph with light beams of substantially the same intensity and equally magnifying said projected images to find a film strip image having substantially the same photographic value as said photograph, and processing a print of said developed motion picture film in accordance with the processing data pertinent to the selected image on said film strip to obtain a print having substantially the same photographic value as said photograph.

2. The method of processing a print of an exposed and developed motion picture negative film which comprises printing a light test strip of a selected portion of said film thereby producing a sequence of picture frame images in successive graduated densities, indicating film processing data appropriate to each of said light test images, simultaneously projecting onto a portion of a screen surface the image of a photograph, of a print from said developed film, of proper density while sequentially projecting onto an adjacent portion of said screen surface the images of said light test strip by illuminating said strip and said photograph with light beams of substantially the same intensity and equally magnifying said images to find a light test strip image having substantially the same density as said photograph, and processing a print of said negative film in accordance with the processing data pertinent to the selected light test strip image to obtain a print having substantially the same density as said photograph.

FRED W. GAGE.